Figure 1:
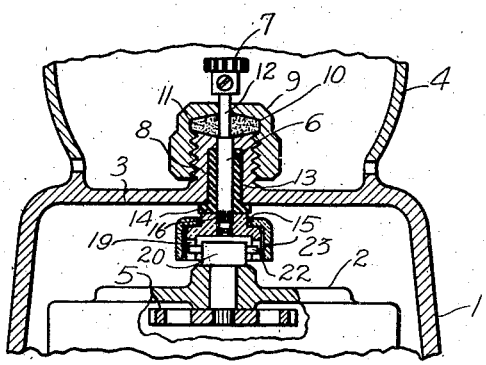

March 24, 1936.    W. H. PARKER    2,035,338
FLUID METER
Filed Feb. 6, 1933

Inventor
WALTER H. PARKER

By Strauch+Hoffman
Attorneys

Patented Mar. 24, 1936

2,035,338

UNITED STATES PATENT OFFICE 2,035,338

FLUID METER

Walter H. Parker, Pittsburgh, Pa., assignor to Pittsburgh Equitable Meter Company, Pittsburgh, Pa., a corporation of Pennsylvania Application February 6, 1933, Serial No. 655,490

3 Claims. (Cl. 73—98)

The invention relates to fluid meters, and particularly to anti-corrosion constructions for water meters.

In United States Patent 1,845,536, granted February 16, 1932, to H. G. Weymouth, is shown one form of water meter having a wall or partition in the casing separating the registering apparatus from the meter chamber and reduction gearing. In this type of meter, the rotation of the reduction gearing is transmitted to the register through a dog and spindle, leakage past the spindle from the meter casing into the register being prevented by a suitable packing surrounding the spindle. Also, in this construction the dog is surrounded by a sleeve to prevent breakage thereof in case of freezing of the water in the meter.

In water meters of this type, considerable difficulty has been experienced by corrosion of the moving parts of the mechanism. For instance, in the dog and spindle construction hereinabove referred to, both the dog and spindle have been subject to corrosion which frequently has been of such a degree at the point where the spindle connects with the dog that the metal has been wasted away and the spindle caused to break at this point, thereby rendering the register mechanism inoperative.

Since meters of this type are only read at relatively long intervals, six months or a year sometimes elapsing between successive readings, the inoperativeness of the meter may pass unnoticed until a large quantity of fluid has passed therethrough unmetered. Obviously, it is desirable to prevent such corrosion of the spindle in order to avoid possible unknown inoperativeness of the meter with consequent loss of revenue.

The dog in the meter also has been subject to corrosion to a sufficient extent to seriously interfere with the proper operation of the meter.

Heretofore, it has been proposed to make the spindle and dog of a corrosion resisting metal, such as German silver, but the same difficulties continued to be experienced with corrosion of these parts. Such continued difficulties arising from the corrosion of these parts are due, I have found, in part at least to electrolytic action. Such action may arise in the meter by reason of stray electric currents conducted through the pipes connecting the meter with the water supply, or may be caused by electrolytic action due to the difference in potential of the metals employed in making the various parts thereof.

In the present invention, I overcome the difficulties arising from the problem of corrosion by surrounding the spindle where it would otherwise contact with adjacent portions of the meter with a bushing which is substantially a dielectric, and by making the dog of electrically insulating or dielectric material to prevent electric currents from passing through the motion transmission mechanism.

Accordingly, it is an object of the present invention to prevent metal to metal contact in certain parts of a meter to eliminate corrosion due to electrolytic action.

A further object of this invention is to provide means whereby mechanism of a meter which is ordinarily subject to corrosion by electrolytic action is protected from contact with the fluid passing through the meter.

Another object of this invention is to prevent corrosion of transmission elements of a meter which operate in the fluid passing therethrough and which would ordinarily be subject to corrosion by electrolytic action by forming the elements of dielectric material.

Still a further object of this invention is to provide electrically insulating material in a fluid meter between the fluid-operated mechanism and the registry mechanism to prevent electrolytic action and consequent corrosion of the connecting mechanism.

A further object of this invention is to protect the spindle connecting the fluid-operated mechanism and the registry mechanism of a fluid meter from electrolytic action and consequent corrosion by mounting it in a dielectric bearing and connecting it to the fluid-operated mechanism through a transmission element formed of dielectric material.

Figure 2:
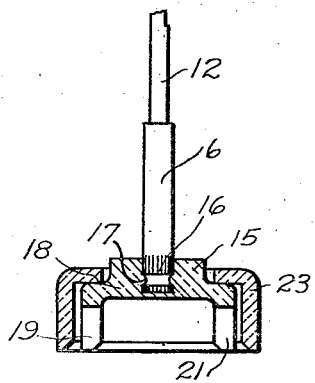
Figure 3:
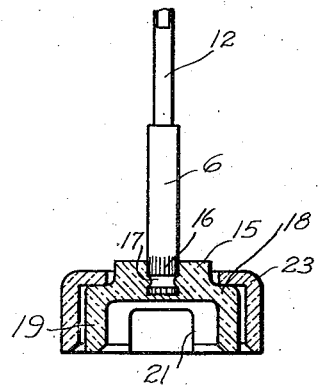
Figure 4:
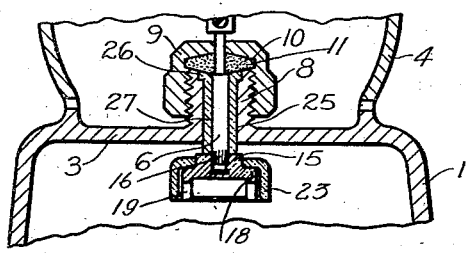

Other objects of this invention will become apparent as the description proceeds taken in connection with the accompanying drawing wherein Figure 1 is a fragmentary view of a meter showing a preferred embodiment of the pesent invention, Figures 2 and 3 are enlarged views of details thereof, and Figure 4 is a modified form of the preferred embodiment.

Referring to the drawing, the numeral 1 shows a portion of the outside metal casing of a water meter which usually is constructed of cast brass and within which is located a metering chamber (not shown) and a reduction gearing chamber 2. The metering chamber and gear chamber 2 are ordinarily surrounded by water, and a partition 3 separates the liquid containing part of the casing 1 from a register-containing part 4 of the casing. As is well known, in this type of meter the motion of a nutating disc is transmitted to the gearing indicated generally by the numeral 5, and this rotary motion is transmitted through parts which will be described more fully hereinafter to a rotary spindle 6, which has a gear 7 on its end adapted to mesh with suitable gearing for operating the register (not shown).

In order to prevent liquid from the lower part of the casing 1 entering the upper part 4 of the casing, the partition 3 is provided with a hub portion 8 suitably threaded on the outside to receive a gland or follower 9 which provides a packing chamber or stuffing box 10 within which is located a suitable packing 11. An end 12 of the spindle 6 is reduced in diameter where it passes through the packing 11 in order to reduce the surface area thereof and consequently reduce frictional resistance.

The hub 8 is counterbored, as at 13 to provide for insertion of a bushing 14 which may be made of any suitable electrical insulation or dielectric material, but preferably is made of hard rubber, bakelite or like material. The bushing 14 is non-rotatably secured in the counterbore and may be extended downward to cover the lower part of the spindle 6 and abut the outer wall of a driven dog 15. The driven dog is also made of electrical insulation material such as bakelite or the like and preferably is constructed by molding it into shape around the spindle 6 which is longitudinally corrugated at its ends as indicated by 16 to prevent relative rotation between the spindle and driven dog, and which also is recessed at 17 to prevent separation of the spindle and driven dog. Preferably the spindle 6 does not extend entirely through the dog 15, but only part way therethrough in order that the end of the spindle may not contact with fluid in the lower chamber.

The driven dog 15 may be of any desired form but preferably is made in the shape of a hollow cylinder closed at one end by a thickened portion forming a shoulder 18. The curved walls 19 thereof are adapted to fit over a driving dog 20 generally made of metal, which is driven through the gearing 5, the walls 19 being traversed by a diametrical slot 21 adapted to receive projecting ends 22 of the driving dog to provide a tongue and groove connection. A cup shaped sleeve 23 which is shown as made of insulating material, but which may be of metal, fits loosely over the driven dog 15 to prevent freezing around the latter in cold weather.

In operation, the rotary motion of the meter is transmitted to the gearing 5; and through the driving dog 20 and projecting ends 22 thereof received in the slot 21, the driven dog 15 is rotated. The spindle 6, being secured to the driven dog, is also rotated, and, by means of the gear 7 at its end, operates the register mechanism. The dog 15, the gearing, and meter mechanism are entirely insulated at points immersed in or subject to the action of liquid from the spindle 6 which generally is made of German silver, so that stray currents or currents arising from electrolytic action cannot have a complete circuit through the spindle. Further, the bushing 14 insulates the spindle 6 from electrical contact with the casing 1 at points completely surrounded by water and prevents electrolytic action therebetween. The corrosion difficulties heretofore experienced have taken place mainly at the base of the spindle 6 where it connects with the dog 15, as this part is surrounded by water and appears to form an electrocouple either with the meter casing 1 or the driven dog 15, when such dog was made of metal, but the bushing 13, by insulating this portion of the spindle from the wall 3, prevents such corrosion.

In the modification shown in Figure 4, the boss or hub 8 has an enlarged bore 25 extending therethrough, and is counterbored at 26 in the packing chamber 10 to receive a flanged bushing 27 of insulation material such as hard rubber or bakelite which extends through the dividing partition 3 and abuts the driven dog 15. In this modification the spindle 6 is entirely insulated from the casing 1 except where the gland 9 contacts therewith, but at this point the packing eliminates the presence of water. Otherwise, the construction is substantially that as shown in Figure 1.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:—

1. In a liquid meter, a metal casing, reduction gearing in said casing adapted to be driven by a liquid passing through said meter, a metallic spindle, a wall in the casing having a hub portion with a hole therethrough to receive said spindle in journalled relation, and a counterbore in said hub portion, a bushing of insulating material in said counterbore substantially surrounding said spindle, and driving means of insulating material between said reduction gearing and said spindle, said bushing and said driving means substantially sealing said spindle from contact with the liquid.

2. In a liquid meter, a metal casing, a bushing of dielectric material extending through a wall of said casing, a metal spindle journaled in said bushing and extending therethrough for driving the register mechanism of said meter, metal gearing in said casing, and a driving connection of dielectric material between said gearing and said spindle, said bushing and driving connection being arranged to substantially seal said spindle from contact with the liquid.

3. In a liquid meter, a metal casing, a rubber bushing extending through a wall of said casing, a metal spindle journaled in said bushing and extending therethrough for driving the register mechanism of said meter, metal gearing in said casing, a driving connection of bakelite between said gearing and said spindle, said bushing and driving connection being arranged to substantially seal said spindle from contact with the liquid.

WALTER H. PARKER.